(12) United States Patent
Uebori et al.

(10) Patent No.: US 9,199,729 B1
(45) Date of Patent: Dec. 1, 2015

(54) COAXIAL COUNTER-ROTATING UNMANNED HELICOPTER

(71) Applicant: Hirobo Co., Ltd., Fuchu-shi (JP)

(72) Inventors: Takakazu Uebori, Fuchu (JP); Shunichi Suzuki, Fuchu (JP)

(73) Assignee: Hirobo Co., Ltd., Hiroshima (JP)

( * ) Notice: Subject to any disclaimer, the term of this patent is extended or adjusted under 35 U.S.C. 154(b) by 21 days.

(21) Appl. No.: 14/272,839

(22) Filed: May 8, 2014

(51) Int. Cl.
*B64C 27/10* (2006.01)
*B64C 39/02* (2006.01)
*G05D 1/00* (2006.01)

(52) U.S. Cl.
CPC .............. *B64C 27/10* (2013.01); *B64C 39/024* (2013.01); *G05D 1/0011* (2013.01); *B64C 2201/024* (2013.01); *B64C 2201/141* (2013.01); *B64C 2201/146* (2013.01)

(58) Field of Classification Search
CPC  B64C 27/10; B64C 39/024; B64C 2201/146; B64C 2201/141; B64C 2201/024; G05D 1/0011
See application file for complete search history.

(56) References Cited

U.S. PATENT DOCUMENTS

| 2,481,748 | A |   | 9/1949 | Hiller, Jr. |  |
|---|---|---|---|---|---|
| 2,835,331 | A | * | 5/1958 | Ryan et al. | 416/129 |
| 4,367,063 | A | * | 1/1983 | Herruzo | 416/115 |
| 4,531,692 | A | * | 7/1985 | Mateus | 244/17.19 |
| 2006/0056971 | A1 | * | 3/2006 | D'Anna | 416/130 |
| 2014/0091172 | A1 | * | 4/2014 | Arlton et al. | 244/17.23 |

FOREIGN PATENT DOCUMENTS

| JP | 57-200288 | 12/1982 |
| JP | 62-12500 | 1/1987 |
| JP | 2002-316699 | 10/2002 |
| JP | 2005-289128 | 10/2005 |
| JP | 2010-120641 | 6/2010 |
| JP | 2011-502869 | 1/2011 |
| WO | 2009/062407 A1 | 5/2009 |

* cited by examiner

*Primary Examiner* — Valentina Xavier
(74) *Attorney, Agent, or Firm* — The Webb Law Firm (57) ABSTRACT

To configure the yaw axis control mechanism of a coaxial counter-rotating unmanned helicopter to be able to accurately control the pitch angle of the upper rotor blade by a simple configuration even if the precise adjustment is not performed. A rudder control rod is inserted into a main mast of a coaxial counter-rotating helicopter, a lower end portion thereof is connected to an output lever of the rudder servo, and a mixing rod head is fixed to an upper end portion. A link mechanism connected to the upper swash plate is attached to a side surface portion of the mixing rod head, the vertical displacement of the mixing rod head moving up and down together with the rudder control rod is converted into a displacement for tilting an upper blade holder around the spindle via the link mechanism, thereby changing the pitch angle of the upper rotor blades.

2 Claims, 6 Drawing Sheets

COAXIAL COUNTER-ROTATING UNMANNED HELICOPTER

BACKGROUND OF THE INVENTION

1. Field of the Invention

The present invention relates to a coaxial counter-rotating unmanned helicopter in which upper and lower main rotors rotating in opposite directions to each other are provided on a main mast and which flies by a remote control or an autonomous control.

2. Description of Related Art

A coaxial counter-rotating helicopter is configured to simultaneously achieve a generation of lift and an offset of torque by rotating upper and lower main rotors disposed coaxially along the main mast in opposite directions to each other, and a direction control (a control of a yaw axis) of a nose of an aircraft changed to a tail rotor is achieved by providing a difference in pitch angles of the rotor blades in the upper main rotor and the lower main rotor in a variable pitch type.

In this case, in a configuration in which the tilting of the upper and lower main rotors are individually controlled by a method, such as attaching a servo to the main mast, to provide a difference in the pitch angles of the upper and lower rotor blades, mechanisms around the main mast become significantly complicated (for example, see Patent Document 1).

Therefore, a configuration has been known in which an inner shaft is provided inside a main mast in a vertically movable manner, a relay link device connected via an upper swash plate, a rod, and a link arm is disposed in a portion between an upper main rotor of the main mast and the upper swash plate, a connecting rod provided vertically downward through a yoke of the upper main rotor from a leading end of the inner shaft is connected to the relay link device, the inner shaft is vertically moved to vertically displace the relay link device, as a result, a fixed arm of the upper main rotor connected to the upper swash plate via the rod is rotationally moved to change a pitch angle of a rotor blade, and thus, a control of a yaw axis of an aircraft is performed (for example, see Patent Document 2).

RELATED ART

Patent Document

[Patent Document 1] JP 62-12500 A
[Patent Document 2] JP 2002-316699 A

SUMMARY OF THE INVENTION

In the above-described related art, since the relay link device is disposed between the upper main rotor and the upper swash plate, there has been a problem in that a distance between the upper and lower main rotors becomes necessarily longer, which makes it difficult to form a compact aircraft, and a degree of freedom of an aircraft design is also limited. Furthermore, since the connecting rod is caused to pass through the interior of the yoke for fixing the upper main rotor to the main mast, strength of the yoke is low, and there has been a structural problem in that the connection portion between the upper main rotor and the main mast to which great force is applied during flight is likely to be damaged.

Furthermore, since the link arm is attached to a peripheral surface of the relay link device and the rod connected to the upper swash plate disposed immediately below is connected to the link arm, a vertical operation region along the main mast of the relay link device is very small, and even when the relay link device is slightly moved up and down, the pitch angle of the rotor blade controlled by the upper swash plate greatly changes.

In other words, since an amount of change in the pitch angle of the rotor blade with respect to an amount of displacement of the relay link device moved up and down by the inner shaft is very great, it is difficult to adjust an amount of operation range of the link mechanism so that the pitch angle of the rotor blade is precisely and accurately set, and since it is difficult to perform the yaw axis control of the aircraft by slightly adjusting the pitch angle, it is difficult to achieve satisfactory operability and flight stability in the remote control type.

Furthermore, in various forms of remote control helicopters (hereinafter, collectively referred to as an R/C helicopter), including a coaxial counter-rotating R/C helicopter, as a result of verifying a position where the gyro precession of the main rotor with respect to the operation input of the swash plate appears, the present applicant has found that the gyroscopic precession appears within a range smaller than 90° with respect to the operation input from the swash plate, regardless of the weight of the main rotor blade.

It is reasonable that the main rotor is disposed at a position where the gyro precession actually appears, and thus, it is believed that operability and flight stability of the coaxial counter-rotating R/C helicopter may be improved.

In view of such problems of the related art, an object of the present invention is to make an accurate control of the pitch angle of the upper rotor blade possible even when a precise adjustment is not performed, by providing a simple yoke axis control mechanism of a coaxial counter-rotating unmanned helicopter in which members such as a rod and a relay link for a yaw axis control are not disposed around the main rotor, and to stabilize the flight operation of the coaxial counter-rotating unmanned helicopter including the yaw axis control, thereby improving the operability.

According to an aspect of the invention for solving the above-described problems, there is provided a coaxial counter-rotating unmanned helicopter in which upper and lower main rotors are attached to a rotary shaft rotating in opposite directions to each other on the same axis provided on a main mast, and which flies by changing a pitch angle of rotor blades of the upper and lower main rotors by tilting upper and lower swash plates, in which the helicopter has a configuration in which a rudder control rod is inserted into the main mast, a rudder servo is connected to a lower end portion of the rudder control rod protruding from a lower end portion of the main mast via a link mechanism, and the rudder control rod moves up and down by an operation of the rudder servo, a mixing rod head is fixed to an upper end portion of the rudder control rod protruding from an upper end portion of the main mast, the link mechanism configured to connect an upper blade holder rotatably mounted to a yoke of the upper main rotor and the upper swash plate is mounted to both right and left side portions of the mixing rod head, and the other end portion of an adjusting rod having one end portion connected to a rudder stopper plate attached to the yoke of the upper main rotor is connected to both front and rear side portions of the mixing rod head, the mixing rod head moving up and down along with the rudder control rod by the operation of the rudder servo is supported by the rudder stopper plate and the adjusting rod, and a vertical displacement of the mixing rod head is converted into a displacement of tilting the upper blade holder around a spindle via the link mechanism to change a pitch angle of the upper rotor blade, thereby providing a difference in the pitch angles of the rotor blades of the upper and lower main rotors.

Furthermore, according to the invention, the coaxial counter-rotating unmanned helicopter of the above-described configuration has a configuration in which the upper and lower main rotors are provided so that gyro precession of each of the main rotors as an output with respect to an operation input from the upper and lower swash plates appears within a range smaller range than 90°, mounting positions of the upper and lower main rotors are provided at an angle smaller than 90° around the main mast with respect to input positions of each of cyclic controls to the upper and lower main rotors using the upper and lower swash plates, and the upper and lower main rotors and the upper and lower swash plates are connected to one another via the link mechanism.

According to the present invention, the helicopter is configured so that the mixing rod head is fixed to an upper end portion of the rudder control rod projecting from the upper end portion of the main mast through the rudder control rod which operates up and down within the main mast, and the link mechanism connected to the upper swash plate is attached to a side surface portion of the mixing rod head, that is, the upper part of the upper main rotor, the input from the upper swash plate and the vertical displacement of the mixing rod head accompanied by the vertical movement of the rudder control rod are mixed with each other by the link mechanism and are transmitted to the upper blade holder, the pitch angle of the upper rotor blade changes by tilting of the upper blade holder, and a difference is generated in the pitch angles of the lower main rotor and the rotor blade.

Since the member for controlling the yaw axis is installed above the upper main rotor, there is no need to set a distance between the upper and lower main rotors longer than necessary, a degree of freedom of the aircraft design increases compared to the related art, and the compact aircraft can be formed.

Further, the mixing rod head as a vertically displacing member is installed on the upper end of the rudder mixing rod, a large arrangement interval is set between the mixing rod head and the upper swash plate, and both members are connected by the link mechanism. Thus, by providing a certain degree of large vertical operating range of the mixing rod head and setting an amount of changing the pitch angle of the upper rotor blade in response to the operating range, even when the amount of operation range of the link mechanism is not subtly adjusted, it is possible to precisely and accurately control the pitch angle of the upper rotor blade to a predetermined angle. Since it is possible to perform the yaw axis control of the aircraft by precisely controlling the pitch angle of the upper rotor blade, it is possible to obtain the satisfactory operability and flight stability in the remote control type.

Furthermore, according to the present invention, in response to the appearance of the gyro precession of the main rotor as the output with respect to the operation input from the swash plate within a range smaller than 90°, by adjusting the phase angle of the upper and lower main rotors with respect to the operation input from the swash plate to a range of an acute angle rather than 90° and attaching the main motors to the main mast, respectively, even when various setting positions of the aircraft and the transmitter are not precisely adjusted, it is possible to stabilize the flight operation of the unmanned helicopter, thereby dramatically improving the operability.

BRIEF DESCRIPTION OF THE DRAWINGS

FIG. 7(A) illustrates a conventional rotor head, and FIG. 7(B) illustrates a rotor head of the present invention.

DESCRIPTION OF THE INVENTION

A preferred embodiment of the invention will be described with reference to the drawings.

Figure 1:
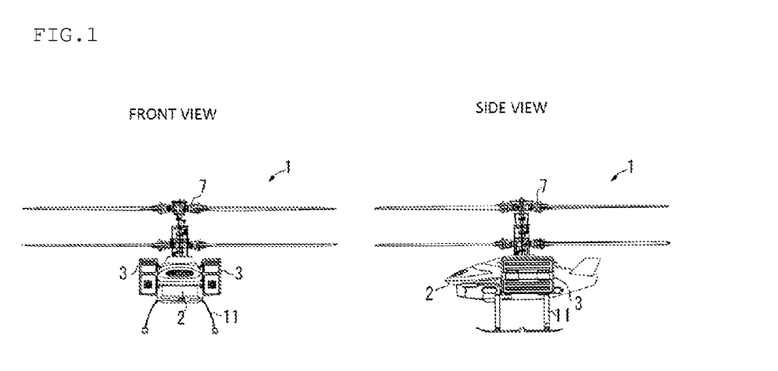
FIG. 1 is a front view and a side view of an R/C helicopter equipped with a rotor head of an embodiment of the present invention.

FIG. 1 illustrates an external form of an R/C helicopter equipped with a rotor head of an embodiment of the invention. As illustrated, the present embodiment is an application of the invention to a coaxial counter-rotating R/C helicopter having upper and lower main rotors that coaxially counter-rotate to each other. In FIG. 1, reference numeral 1 is an R/C helicopter, 2 is a cowl, and 3 is a battery that drives an electric motor to be described later.

Figure 2:
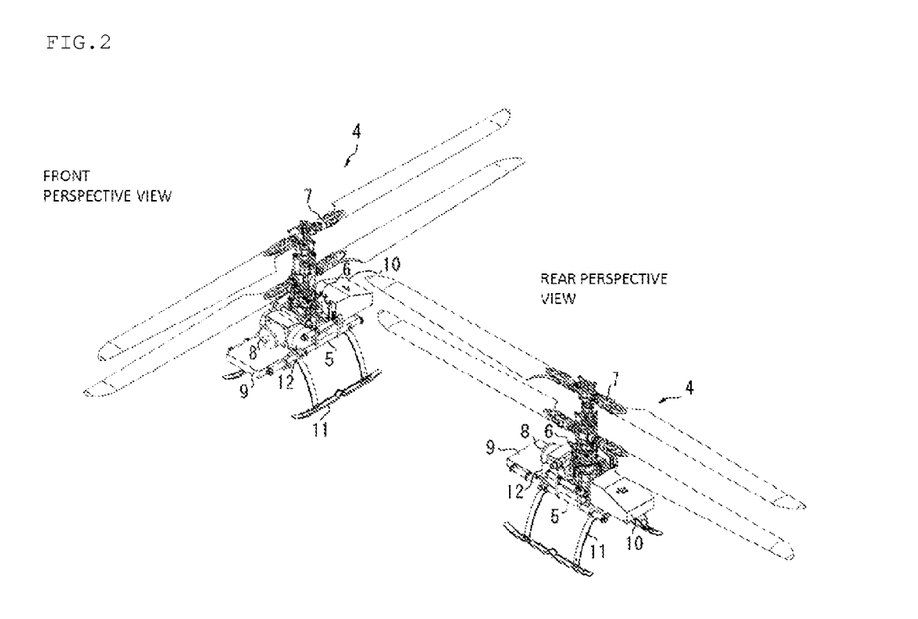
FIG. 2 is an enlarged external perspective view as a front perspective view and a rear perspective view of the aircraft of a state in which a cowl of the R/C helicopter of FIG. 1 is removed.

FIG. 2 illustrates an external form of a front side and a rear side of an aircraft of the R/C helicopter 1 in a state of removing the cowl 2. As illustrated in FIG. 2, an aircraft 4 is configured so that respective unitized members, such as a gearbox unit 6 formed by assembling an electric motor 8 to a rotor head 7 to which the upper and lower main rotors are attached, a motor control box 9 in which a control circuit of the electric motor 8 is housed, a servo control box 10 in which control circuits of each servo are housed, skids 11, and a receiver of a steering signal (not illustrated) are integrally attached to an aircraft frame 5 configured by assembling pipes made of aluminum in a frame shape. Reference numeral 12 is a ducted motor cover which accommodates a motor fan for cooling the electric motor 8 therein.

As illustrated in FIGS. 3 to 6, the rotor head 7 is configured to include members such as a main mast 13, upper and lower main rotors 14 and 15, swash plates 16 and 17, an elevator servo ES, an aileron servo AS, a pitch servo PS, and a rudder RS, and rods that connect actuating units of these members to one another to constitute a link mechanism.

Figure 6:
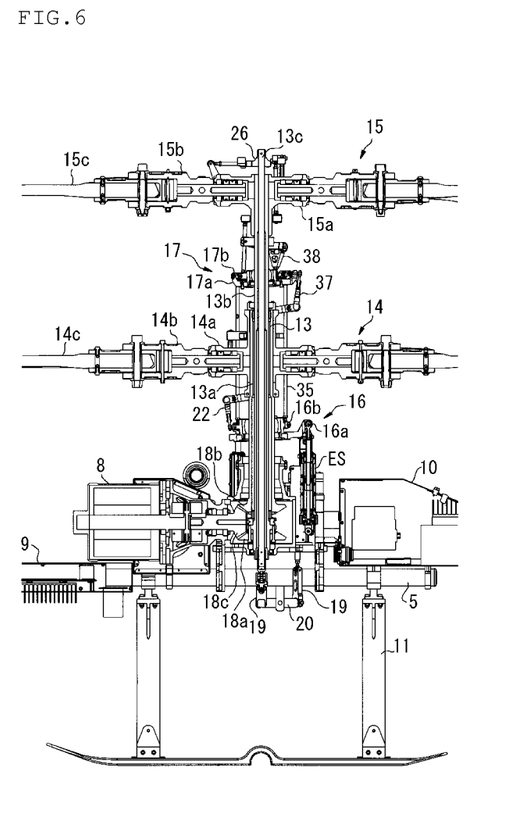
FIG. 6 is a schematic transverse cross-sectional view of the aircraft of FIG. 2 (break line is omitted for clarity).

Specifically, the main mast 13 is configured so that an upper main mast 13b longer than a hollow lower main mast 13a is mounted on the interior of the hollow lower main mast 13a and is coaxially disposed, as illustrated in FIG. 6, bevel gears 18a and 18b fixed to each of lower end portions of both masts are engaged and connected to a bevel gear 18c fixed to an output shaft of the electric motor 8 installed below the main mast 13, and both masts rotate in opposite directions to each other by driving the electric motor 8.

A rudder mixing rod 13c is slidably inserted into the upper mainmast 13b along an inner circumferential surface of the upper main mast 13b, the upper end portion of the rudder mixing rod 13c projects above the main mast 13, a mixing rod head 26 to be described later is integrally fixed thereto, and an end portion of a rudder push-pull arm 19 is connected to a lower end portion thereof via a bearing.

The mixing rod head 26 is attached to the upper main rotor 15 via a rudder stopper plate 31 and an adjusting rod 28 that will be described later, and rotates integrally with the upper main rotor 15 within the main mast 13.

The other end portion of the rudder push-pull arm 19 is pivotally supported at one end portion of a rudder mixing arm 20 attached below the main mast 13 in a state in which a center thereof is rotatably pivotally supported, the other end portion of the rudder mixing arm 20 is connected to the other end portion of the rudder push-pull arm 19, one end of which is connected a downward output lever 34 connected to the servo horn of the rudder servo RS (see FIG. 6).

Figure 3:
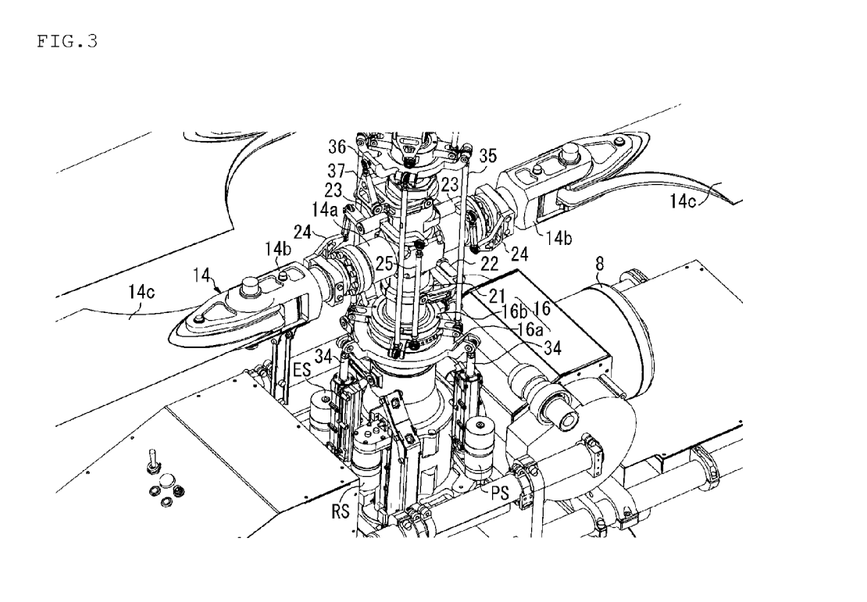
FIG. 3 is an external perspective view of the rotor head illustrating an enlarged lower main rotor side of the aircraft of FIG. 2.

As illustrated in FIG. 3, the lower main rotor 14 is constituted by a lower yoke 14a integrally fixed to an outer periphery of the lower main mast 13a, a pair of lower blade holders 14b and 14b rotatably attached to both right and left sides of the lower yoke 14a about an axial direction perpendicular to the main mast 13, and lower rotor blades 14c and 14c that are integrally attached to the lower blade holders 14b and 14b at a predetermined pitch angle by interposing between the base end portions of the lower blade holders 14b and 14b from both upper and lower surfaces and allowing a bolt to pass therethrough.

The lower yoke 14a is integrally fixed with a lower radius block 21 on a circumferential surface portion of the lower yoke 14a integrally fixed to an outer circumferential surface of the lower main mast 13a, and a lower radius arm 22 connected to the lower radius block 21 is integrally connected to a lower rotary swash 16b of a lower swash plate 16 to be described later.

Furthermore, end portions of mixing arm lowers 23 and 23 rotatably attached to the lower yoke 14a about the axial direction perpendicular to the mast 13 as a fulcrum are rotatably connected to the lower blade holders 14b and the 14b respectively, via the lower pitch arm 24.

The other end portions of the mixing arm lowers 23 and 23 are connected to the upper end portions of the adjusting rods 25 and 25 vertically disposed parallel to the mast 13, and the lower end portions of the adjusting rods 25 and 25 are connected to the lower rotary swash 16b of the lower swash plate 16.

The lower main rotor 14 is configured so that the tilting motion of the lower swash plate 16 to be described later is transmitted to the lower blade holders 14b and 14b via the adjusting rod 25, the mixing arm lower 23, and the lower pitch arm 24, while rotating integrally with the lower main mast 13a, and the entire lower main rotor 14 is appropriately tilted in accordance with titling of the lower blade holders 14b and 14b about the axis direction perpendicular to the main mast 13, thereby changing the pitch angle of the lower rotor blades 14c and 14c.

Figure 4:
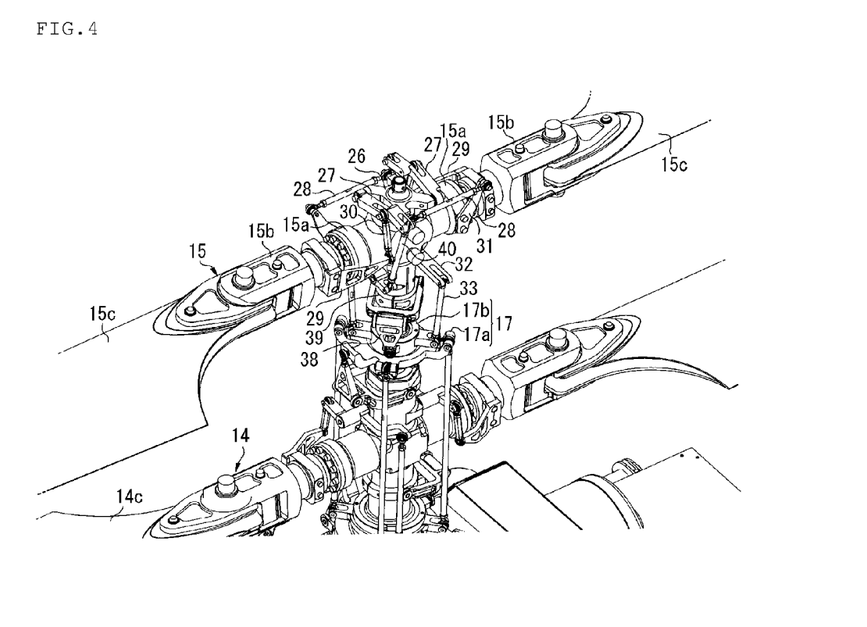
FIG. 4 is an external perspective view of the rotor head illustrating an enlarged upper main rotor side of the aircraft of FIG. 2.

As illustrated in FIG. 4, the upper main rotor 15 is configured in the same manner as the lower main rotor 14, by an upper yoke 15a integrally fixed to the outer periphery of the upper main mast 13b, a pair of upper blade holders 15b and 15b attached to both right and left sides of the upper yoke 15a so as to be freely rotatable around the axial direction perpendicular to the main mast 13, and upper rotor blades 15c and 15c integrally attached to the upper blade holders 15b and 15b at a predetermined pitch angle by interposing the base end portions of the upper blade holders 15b and 15b from both upper and lower surfaces and allowing a bolt to pass therethrough.

Above the upper main rotor 15, the mixing rod head 26 is attached to the end portion of the rudder mixing rod 13c protruding from the upper end of the main mast 13. Upper mixing arms 27 and 27 are attached to both right and left sides of the mixing rod head 26 positioned above the upper yoke 15a so as to be freely rotatable about the axis direction, as a fulcrum, perpendicular to the mast 13. Furthermore, the adjusting rods 28 and 28, which are freely rotatable about the axial direction, as a fulcrum, perpendicular to the mast 13 and disposed along the axial direction of the upper main rotor 15, are attached to both front and rear sides of the mixing rod head 26.

Figure 5:
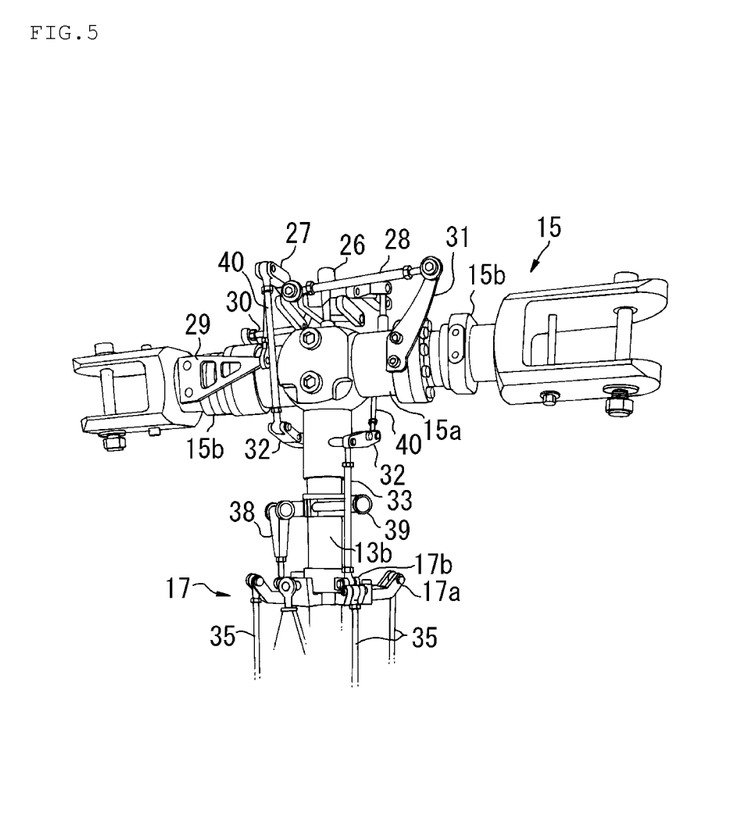
FIG. 5 is an external view of the upper main rotor portion of a state of removing the rotor blades of the aircraft of FIG. 2.

Upper pitch arms 29 and 29 are attached to one side of the upper blade holders 15b and 15b, and the end portion of the upper pitch arm 29 is connected to a shaft unit provided in an intermediate portion of the mixing arm upper 27 via an adjusting rod 30. Furthermore, as illustrated in FIG. 5, a rudder stopper plate 31 is attached to the upper yokes 15a and 15a, and the other end portion of the adjusting rod 28 connected to the mixing rod head 26 at one end is connected to the end portion of the rudder stopper plate 31. The rudder stopper plate 31 and the adjusting rod 28 have also a function that supports the mixing rod head 26 so that the mixing rod head 26 moving up and down along the main mast 13 is not twisted by force exerted with the rotation of the main mast 13 during flight.

Furthermore, the end portions of the mixing arm uppers 27 and 27 are connected to the mixing arm upper 32 pivotally supported on the outer circumferential surface of the upper yoke 15a via the adjusting rod 40, and the mixing arm upper 32 is connected to an upper top rotary swash 17b of an upper swash plate 17 to be described later via an adjusting rod 33 that is pivotally supported to the end portion.

The upper main rotor 15 is configured so that the tilting motion of the upper swash plate 17 to be described later is transmitted to the upper blade holders 15b and 15b via the adjusting rod 33, the mixing arm upper 32, the upper mixing arm 27, and the upper pitch arm 29, while rotating integrally with the upper main mast 13b, and the entire upper main rotor 15 is appropriately tilted in accordance with titling of the upper blade holders 15b and 15b about the axis direction perpendicular to the main mast 13, thereby changing the pitch angle of the upper rotor blades 15c and 15c.

Furthermore, in the upper main rotor 15, as will be described below, when vertically moving the rudder mixing rod 13c along the mast 13 by actuating the rudder RS, the rudder mixing rod 13c and the mixing rod head 26 fixed to the upper end thereof are vertically displaced, the upper mixing arms 27 and 27 vertically rotate in response to the displacement, thereby mixing and transmitting the input from an upper top rotary swash 17b to be described later to the upper blade holders 15b and 15b, the pitch angle of the upper rotor blades 15c and 15c changes to provide a difference between the pitch angle of the upper main rotor 15 and the pitch angle of the lower main rotor 14 so that the yaw axis control of the R/C helicopter 1 is performed.

As illustrated in FIG. 3, the lower swash plate 16 is configured so that the lower rotary swash 16b is rotatably supported on the upper side of the lower fixing swash 16a via a bearing (not illustrated). The main mast 13 passes through an opening formed in the center thereof and is tiltably mounted about the axis of the direction perpendicular to the mast around the mast.

Each servo of the an elevator servo ES, the aileron servo AS, and the pitch servo PS is installed below the lower swash plate 16, thereby connecting an upward output lever 34 connected to each of the servo horns to the outer circumferential three sides of the lower fixing swash 16a, respectively.

The lower rotary swash 16b is attached to the lower yoke 14a via the lower radius arm 22 and the upper radius block 21 to rotate integrally with the lower main mast 13a. Furthermore, the lower end portions of the adjusting rods 25 connected to the mixing arm lower 23 at the upper end portion are connected to the opposed positions of the outer circumferential surface of the lower rotary swash 16b, the lower end portions of the four adjusting rods 35 are connected to the outer circumferential four sides, and the upper end portions of the adjusting rods 35 are connected to the outer circumferential four sides of the upper bottom rotary swash 17a of the upper swash plate 17 to be described below.

As illustrated in FIG. 4, the upper swash plate 17 is configured so that the upper top rotary swash 17b is rotatably supported on the upper side of the upper bottom rotary swash 17a via a bearing (not illustrated). The main mast 13 passes through an opening formed at the center thereof and is tiltably attached about the axis of the direction perpendicular to the mast around the mast.

Furthermore, the outer circumferential four sides of the upper bottom rotary swash 17a are connected to the outer circumferential four sides of the lower rotary swash 16b via the adjusting rod 35, are fixed to the lower yoke 14a via the upper radius block 36 and the upper radius arm 37, and are attached so as to rotate integrally with the lower main rotor 14.

Furthermore, the upper top rotary swash 17b is fixed to the upper radius block 39 fixed to the outer circumferential surface of the upper main mast 13b via the upper radius arm 38 to rotate integrally with the upper main mast 13b along with the upper main rotor 15.

Furthermore, the lower end portions of the adjusting rod 33 connected to the mixing arm upper 32 at the upper end portion are connected to the opposed positions of the outer circumferential surface of the upper top rotary swash 17b, respectively.

In the lower swash plate 16 and the upper swash plate 17, when driving the elevator servo ES, the aileron servo AS, or the pitch servo PS to move up and down the upward output lever 34 connected to each servo horn, the lower fixing swash 16a and the lower rotary swash 16b of the lower swash plate 16 are tilted around the main mast 13 in response to the position of the output lever 34 moving up and down, and along with the tilting of the lower rotary swash 16b, the upper and lower rotary swashes 17a and 17b of the upper swash plate 17 are attached to tilt around the main mast 13 in parallel to the lower swash plate 16.

Figure 7:
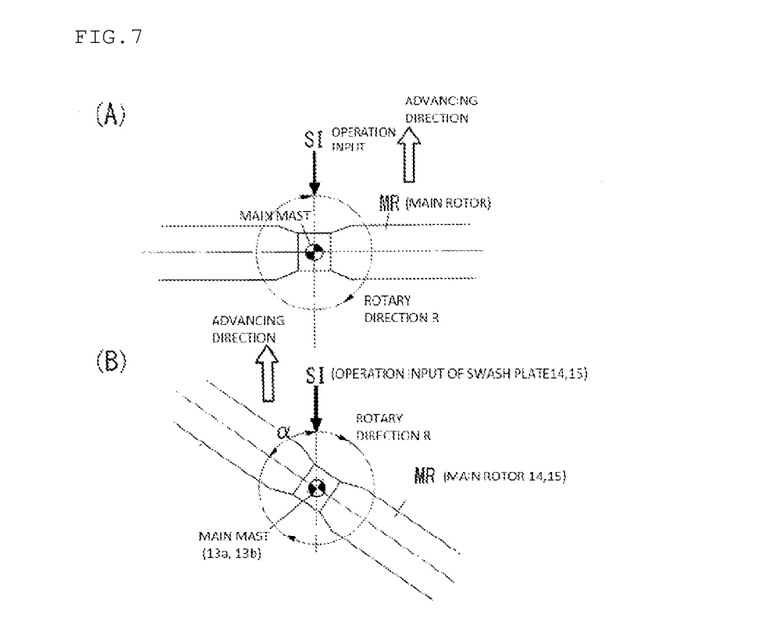
FIG. 7 is a diagram illustrating an arrangement relation between an input position of a cyclic control of a swash plate around the main mast and the main rotors.

Furthermore, in the conventional R/C helicopter, as illustrated in FIG. 7(A), on the basis of the finding that the gyro precession appears to be delayed by 90° with respect to the input, the rudder is input at a position delayed by 90° with respect to the rotary direction R of the main rotor MR using this, that is, the swash plate is tilted at a position delayed by 90° with respect to the rotary direction of the main rotor MR, and the operation input SI is input to the main rotor MR via the adjusting rod to change the pitch angle of the main rotor MR.

In contrast, in the arrangement of the lower main rotor 14 and the lower swash plate 16 around the lower main mast 13a in this embodiment, on the basis of the finding that the gyro precession appears within a range smaller than 90°, in response thereto, as illustrated in FIG. 7(B), the mounting position of the lower main rotor 14 is provided to become an angle smaller than 90° around the lower main mast 13a with respect to the input position of the cyclic control to the lower main rotor 14 using the lower swash plate 16, that is, at the position where an angle of intersection in a plan view between line segments in the longitudinal axis direction of the lower main rotor 14 and the position of the operation input of the lower rotary swash 16b that is input to the lower main rotor 14 via the adjusting rod 25 becomes an acute phase angle α.

Moreover, the lower main rotor 14 and the lower rotary swash 16b are connected by the adjusting rod 25, and the operation input of the lower rotary swash 16b is input to the lower main rotor 14 at a position advanced by the acute phase angle α, thereby changing the pitch angle.

In addition, in the arrangement of the upper main rotor 15 and the upper swash plate 17 around the upper main mast 13b, in the same manner as described above, the mounting position of the upper main rotor 15 is provided to become an angle smaller than 90° around the upper main mast 13b with respect to the input position of the cyclic control using the upper swash plate 17, and an angle of intersection in a plane view between the line segments in the longitudinal axis direction of the upper main rotor 15 and the position of the operation input of the upper top rotary swash 17b that is input to the upper main rotor 15 via the adjusting rod 33 becomes the acute phase angle α.

Moreover, the upper main rotor 15 and the upper top rotary swash 17b are connected by the adjusting rod 33, and the operation input of the upper top rotary swash 17b is input to the upper main rotor 15 at a position advanced by the acute phase angle α, thereby changing the pitch angle.

In addition, the operation input positions of each of the upper and lower swash plates 16 and 17, and the mounting positions of the upper and lower main rotors 13 and 14 may be set to be advanced or delayed by a relatively suitable acute angle around the upper and lower main masts 16a and 16b so as to become the acute phase angle α.

The yaw axis control of the R/C helicopter 1 of the present embodiment configured as described above is performed as follows.

Figure 8:
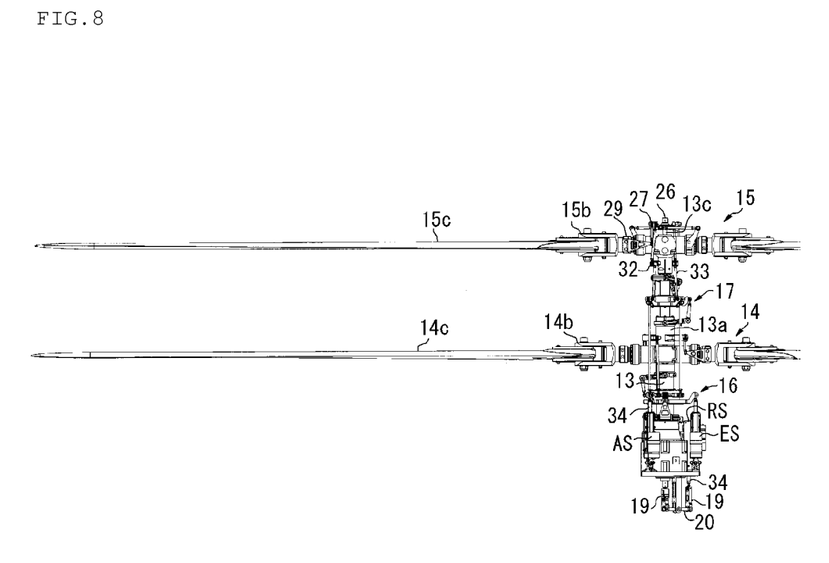
FIG. 8 is a side view of a gear box unit of an aircraft of FIG. 2.

First, as illustrated in FIG. 8, in a state in which there is no difference in the pitch angles of the rotor blades 14c and 15c of the upper and lower main rotors 14 and 15, the output lever 34 of the rudder servo RS is held at an intermediate position of the operating range thereof.

Figure 9:
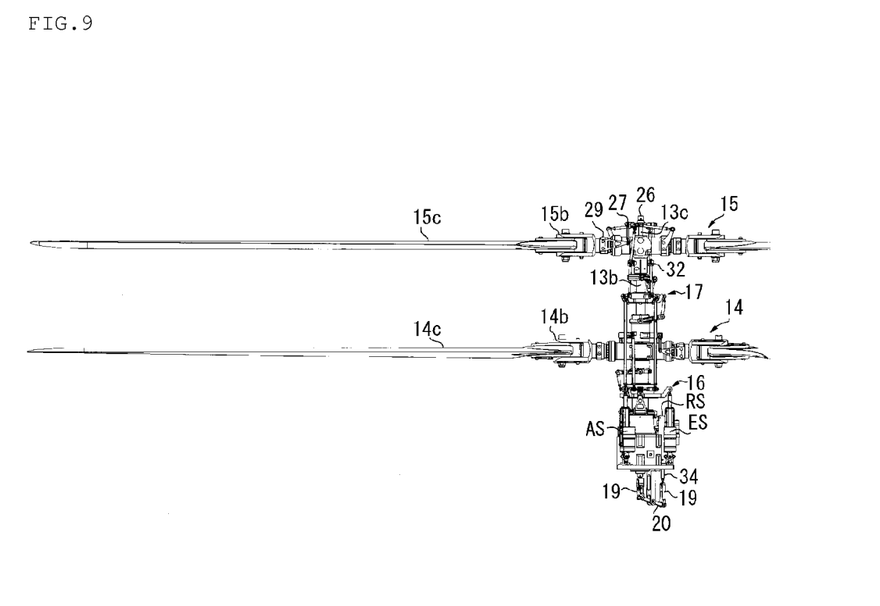
FIG. 9 is a side view of the gear box unit when raising the mixing rod head from the state of FIG. 8.

From this state, when lowering the output lever 34 by operating the rudder RS, as illustrated in FIG. 9, the rudder mixing rod 13c which is loaded in the main mast 13 and rotates integrally with the upper main mast 13b rises, and the upper mixing rod head 26 fixed to the upper end portion is displaced upward.

The upper mixing arms 27 and 27 rotatably attached to the upper mixing rod head 26 rotate around the mounting part in response to the displacement, the end portion is displaced downward, the displacement and the input from the upper top rotary swash 17b connected to the upper mixing arms 27 and 27 via the adjusting rod 33, the mixing arm upper 32, and the adjusting rod 40 are mixed with each other, and are converted into a displacement that tilts the upper blade holders 15b and 15b around the spindles of the upper yokes 15a and 15a. Moreover, the converted displacement is transmitted to the upper blade holders 15b and 15b via the upper pitch arms 29 and 29, the upper blade holders 15b and 15b and the upper rotor blades 15c and 15c are tilted to change the pitch angle, as a result, a difference is generated in the pitch angles of the lower main rotor 14, and the yaw axis control of the aircraft is performed.

Figure 10:
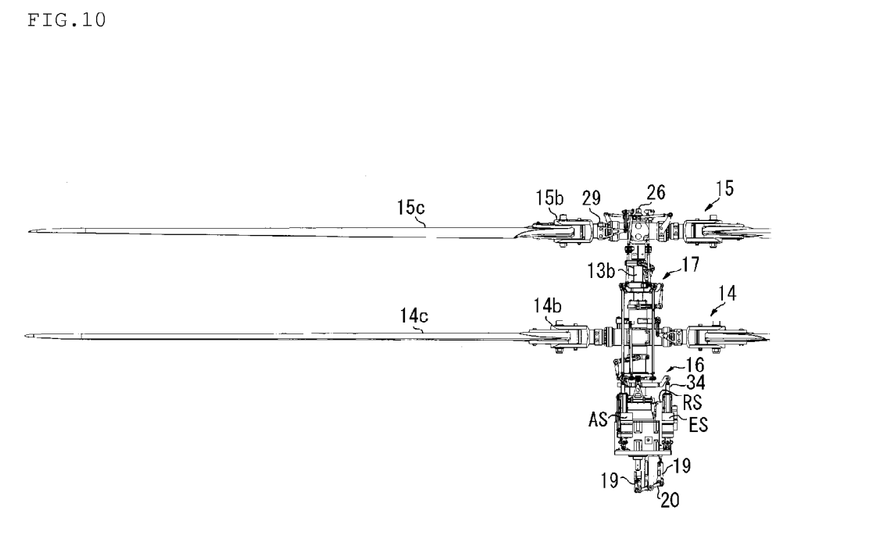
FIG. 10 is a side view of the gearbox unit when lowering the mixing rod head from the state of FIG. 8.

In contrast, when raising the output lever 34 of the rudder servo RS, as illustrated in FIG. 10, the rudder mixing rod 13*c* and the upper mixing rod head 26 are displaced downward, and in response to this displacement, the end portions of the upper mixing arms 27 and 27 are displaced upward. Moreover, the displacement and the input from the upper top rotary swash 17*b* are mixed with each other, converted into a displacement for tilting the upper blade holders 15*b* and 15*b*, and transmitted to the upper blade holders 15*b* and 15*b* via the upper pitch arms 29 and 29, the upper blade holders 15*b* and 15*b* and the upper rotor blades 15*c* and 15*c* are tilted in the direction opposite to the above-described direction to change the pitch angle, a difference is generated between the pitch angle of the upper main rotor 15 and the pitch angle of the lower main rotor 14, and thus, the yaw axis control of the aircraft is performed.

Furthermore, according to the R/C helicopter of this embodiment, when driving the elevator servo ES, the aileron servo AS or the pitch servo PS to move up and down the output lever 34 connected to each servo horn, in response to the position of the output lever 34 moving up and down, the lower swash plate 16 and the upper swash plate 17 are appropriately tilted around the main mast 13, and according to this, the tilting of the lower rotary swash 16*b* is transmitted to the lower main rotor 14 via the adjusting rod 25 to tilt the lower main rotor 14 and change the pitch angle of the lower rotor blades 14*c* and 14*c*, and the tilting of the upper top rotary swash 17*b* is transmitted to the upper main rotor 15 via the adjusting rod 33 to tilt the upper main rotor 15 and change the pitch angle of the upper rotor blades 15*c* and 15*c*.

Along with tilting of the upper and lower main rotors 14 and 15 and the change in the pitch angles of the rotor blades 14*c* and 15*c*, the gyro precession is applied to each of the upper and lower main rotors 14 and 15, but the gyro precession appears to be delayed within a range smaller than 90° with respect to the rotary direction of each of the upper and lower main rotors 14 and 15.

In this embodiment, as illustrated in FIG. 7(B), in response to the appearance of the gyro precession within the range smaller than 90°, the mounting positions of the upper and lower main rotors 14 and 15 are set so as to form a phase angle α smaller than 90° around the main mast 13 with respect to the input position of the cyclic control to the upper and lower main rotors 14 and 15 using the upper and lower swash plates 16 and 17, and are connected to the upper and lower main rotors 14 and 15 via a link mechanism at the input positions of each of the upper and lower swash plates 16 and 17, and the operation inputs of the upper and lower swash plates 16 and 17 are input to each of the upper and lower main rotors 14 and 15 at the position of the acute phase angle α, thereby changing the pitch angle of each of the rotor blades 14*c* and 15*c*.

Accordingly, along with the change of the pitch angles of the rotor blades 14*c* and 15*c* of each of the upper and lower main rotors 14 and 15, the direction of force of the gyro precession acting on the aircraft matches the direction for controlling the aircraft, thereby making it possible to stabilize the flight operation of the R/C helicopter.

EXAMPLES

An industrial coaxial counter-rotating R/C helicopter equipped with the rotor head of this embodiment was constituted. The rotor blade was made of FRP, and a weight of a piece was 2 kg. The total weight of the aircraft including electrical equipment such as a motor, a receiving device, and a battery was 92 kg.

The phase angle α (a phase difference of the arrangement with respect to the operation input) illustrated in FIG. 7(B) between the operation input position of the upper and lower swash plates with respect to the upper and lower main rotors and the upper and lower main rotors was set to approximately 35°.

Comparative Example

The upper and lower main rotors was disposed similar to the conventional R/C helicopter illustrated in FIG. 7(A) using the same aircraft and rotor blades as the above-described embodiment, that is, disposed so that the mounting positions of the upper and lower main rotors with respect to the operation input of the swash plate become a phase angle of 90°, thereby constituting the coaxial counter-rotating R/C helicopter.

When allowing the R/C helicopter of a comparative example to fly by the remote control, the operation of causing the aircraft to go straight was difficult, and behavior bent in a direction of either left or right occurred. When operating the operation stick of the transmitter to correct this, the flight attitude was lost, which makes it difficult to smoothly control the flight direction of the aircraft.

In contrast, even when the R/C helicopter of the embodiment was operated to fly in any direction of front, rear, left or right, it smoothly flew in the operation direction, and it was possible to stably control the flight direction without losing the flight attitude.

In addition, the illustrated embodiment is an example, the present invention is also applicable to a coaxial counter-rotating R/C helicopter of other suitable forms or a coaxial counter-rotating unmanned helicopter that flies by the autonomous control. The invention is also applicable to a relatively large industrial R/C helicopter, an unmanned R/C helicopter, a hobby R/C helicopter flying outdoors, or an indoor compact lightweight R/C helicopter.

The invention claimed is:

1. A coaxial counter-rotating unmanned helicopter comprising upper and lower main rotors attached to a rotary shaft rotating in opposite directions to each other on a same axis provided on a main mast to fly by changing a pitch angle of rotor blades of the upper and lower main rotors by tilting upper and lower swash plates, wherein the helicopter has a configuration in which a rudder control rod is inserted into the main mast, a rudder servo is connected to a lower end portion of the rudder control rod protruding from a lower end portion of the main mast via a link mechanism, and the rudder control rod moves up and down by an operation of the rudder servo, a mixing rod head is fixed to an upper end portion of the rudder control rod protruding from an upper end portion of the main mast, the link mechanism configured to connect an upper blade holder rotatably mounted to a yoke of the upper main rotor and the upper swash plate is mounted to both right and left side portions of the mixing rod head, and the other end portion of an adjusting rod having one end portion connected to a rudder stopper plate attached to the yoke of the upper main rotor is connected to both front and rear sides of the mixing rod head, the mixing rod head moving up and down along with the rudder control rod by the operation of the rudder servo is supported by the rudder stopper plate and the adjusting rod, and the vertical displacement of the mixing rod head is converted into a displacement of tilting the upper blade holder around a spindle via the link mechanism to change a pitch angle of the upper rotor blade, thereby providing a difference in the pitch angles of the rotor blades of the upper and lower main rotors.

2. The coaxial counter-rotating unmanned helicopter according to claim 1, wherein the helicopter has a configuration in which the upper and lower main rotors are provided so that gyro precession of each of the main rotors as an output with respect to an operation input from the upper and lower swash plates appears within a range smaller than 90°, mounting positions of the upper and lower main rotors are provided at an angle smaller than 90° around the main mast with respect to input positions of each of cyclic controls to the upper and lower main rotors using the upper and lower swash plates, and the upper and lower main rotors and the upper and lower swash plates are connected to one another via the link mechanism.

* * * * *